United States Patent [19]
Jost

[11] Patent Number: 6,019,387
[45] Date of Patent: Feb. 1, 2000

[54] AIR BAG

[75] Inventor: Stefan Jost, Wiesbaden, Germany

[73] Assignee: Breed Automotive Technology, Inc., Lakeland, Fla.

[21] Appl. No.: 09/043,739

[22] PCT Filed: Sep. 26, 1996

[86] PCT No.: PCT/GB96/02385

§ 371 Date: Mar. 25, 1998

§ 102(e) Date: Mar. 25, 1998

[87] PCT Pub. No.: WO97/11866

PCT Pub. Date: Apr. 3, 1997

[30] Foreign Application Priority Data

Sep. 27, 1995 [GB] United Kingdom .................. 9519731

[51] Int. Cl.[7] .................................................. B60R 21/22
[52] U.S. Cl. ........................................................ 280/730.2
[58] Field of Search ............................. 280/730.2, 728.2

[56] References Cited

U.S. PATENT DOCUMENTS

| | | | |
|---|---|---|---|
| 3,632,132 | 1/1972 | Richardson | 280/730.1 |
| 3,985,374 | 10/1976 | Powaska | 280/730.1 |
| 5,364,125 | 11/1994 | Brown et al. | 280/730.2 |
| 5,435,594 | 7/1995 | Gille | 280/728.2 |
| 5,676,394 | 10/1997 | Maly | 280/728.3 |
| 5,690,354 | 11/1997 | Logan et al. | 280/728.2 |

FOREIGN PATENT DOCUMENTS

| | | |
|---|---|---|
| 2226275 | 12/1973 | Germany . |
| 4356246 | 12/1992 | Japan . |
| 6278512 | 12/1994 | Japan . |

*Primary Examiner*—Kenneth R. Rice
*Attorney, Agent, or Firm*—Markell Seitzman

[57] ABSTRACT

A vehicle safety arrangment comprising a seat back support (4a) adapted to be attached to the back of a vehicle seat (50) and a side impact protective air bag module comprising an inflator (1) and a folded inflatable air bag (8). The seat back support (4a) is formed with integrally moulded or extruded flanges forming a housing for the inflator (1) and the air bag (8), and with a gas channle (16) linking the inflator (1) with the air bag (8). The arrangement can be placed outside the seat structure and sill not conflict with occupant comfort. Furthermore since it is independent of the seat structure it can be manufactured separately. The arrangement also comprises fewer component parts with attendant cost and weight savings and making it easier to manufacture. The seat back support (4a) is a plastic module which can be snapped or bolted onto the back of a front seat (50) and is generally used to prevent injury to rear passengers such as from submarining. The present invention provides a seat back support (4a) integrated air bag (8) arrangement with either a plastics extruded or a plastics moulded housing design and provides a side impact system that is compact in design and lightweight, easy to assemble and inexpensive.

20 Claims, 7 Drawing Sheets

AIR BAG

The present invention relates to a vehicle safety arrangement, particulary one which incorporates a side impact airbag for protecting an occupant of an, automobile in a crash situation particularly from transverse components of crash forces.

It is known that vehicle occupants can be protected during a side impact collision by introducing an airbag between the occupants torso and the interior of the vehicle. U.S. Pat. No. 3,617,073 is illustrative of a system in which such an airbag protective system is located within a vehicle door. British Patent 222936B shows such an airbag system formed within a seat.

An airbag protective system comprises a folded inflatable fabric airbag and an inflator. Inflators are necessarily bulky and heavy items since they contain compressed gas for inflation which must be safely contained. Traditionally an inflator comprises a cylindrical steel container which is mounted in a metal housing into which the airbag is folded. the resultant package which must be fitted into an automobile is bulky and unsightly and problems have been encountered in mounting such packages in the optimum positions within an automobile for safety purposes whine satisfactorily disguising them to the satisfaction of interior designers, particularly for protection against side impact forces.

With regard to seat mounted airbag systems it is desirable for the airbag and its associated mounting hardware to be constructed in a way that it is compatible with seat design and does not interfere with occupant comfort. It is known to mount the airbag inside the seat structure i.e. to the seat frame, but this requires the airbag module to be installed at an early stage of seat manufacture and for the seat design to be accordingly modified. No retrofitting is possible.

The invention aims to provide a new solution for packaging and deploying a side impact airbag.

According to the present invention there is provided a vehicle safety arrangement comprising a seat back support adapted to be attached to the back of a vehicle seat and a side impact protective airbag module comprising an inflator and a folded inflatable airbag wherein the seat back support is formed with integral flanges so as to provide a housing for the inflator, and a gas channel linking the inflator with the airbag.

Preferably the flanges are moulded or extruded with the seat back support and the resulting moulded or extruded gas channel connecting the inflator to the cushion makes the system work very effectively.

It is an advantage of the invention that such an arrangement is placed outside the seat structure and will not conflict with occupant comfort. Furthermore since it is independent of the seat structure it can be manufactured separately. The arrangement also comprises fewer component parts with attendant cost and weight savings, and making it easier to manufacture. Such a seat back support is becoming a common feature of automobile technology, comprising a plastic module which can be snapped or bolted onto the back of a front seat and is generally used to prevent injury to rear passengers such as from submarine The present invention provides a seat back support integrated airbag arrangement with either a plastic extruded or a plastic moulded housing design and provides a side impact system that is compact in design and lightweight, easy to assemble and inexpensive.

The integral flanges encourage a fixed direction of inflation of the airbag on deployment allowing for better positioning relative to the desired thorax or head protection of the vehicle occupant.

According to a preferred embodiment of the invention a side impact airbag module is provided that is substantially smaller than the height of the back of the seat so that the inflator can be installed at any desired location of the plastic seat back support and avoid interference with existing seat structures. No seat frame modification is necessary.

The arrangement of the present invention may incorporate a variety of shapes of airbag such as for example the elongate arcuate shape or the sausage shape or the combined head and torso shape described in applicant's copending UK Aiplication No. 95 18 444.6.

Preferably the airbag has several mechanical attachment points along the desired deployment gap to further improve the control over inflation direction The side impact airbag module may be exposed (visible) or hidden under the seat back cover from the vehicle occupant(s). In the exposed version the inflating airbag needs only to break a dust protection tape sealing the open edges of the seat back support flanges. Hence the energy of the inflating airbag is optimally preserved.

In the hidden version the airbag may be folded in a flexible fabric pocket attached to a seam of the seat cover. The inflating airbag causes both the pocket and seat seam to tear. The thread of the tear seam is arranged to be the weakest point of the system typically 100 to 500 Newtons.

For a better understanding of the present invention and to show how the same may be carried into effect, particular embodiments will now be described, by way of example, and reference will be made to the accompanying drawings in which.

Figure 4:
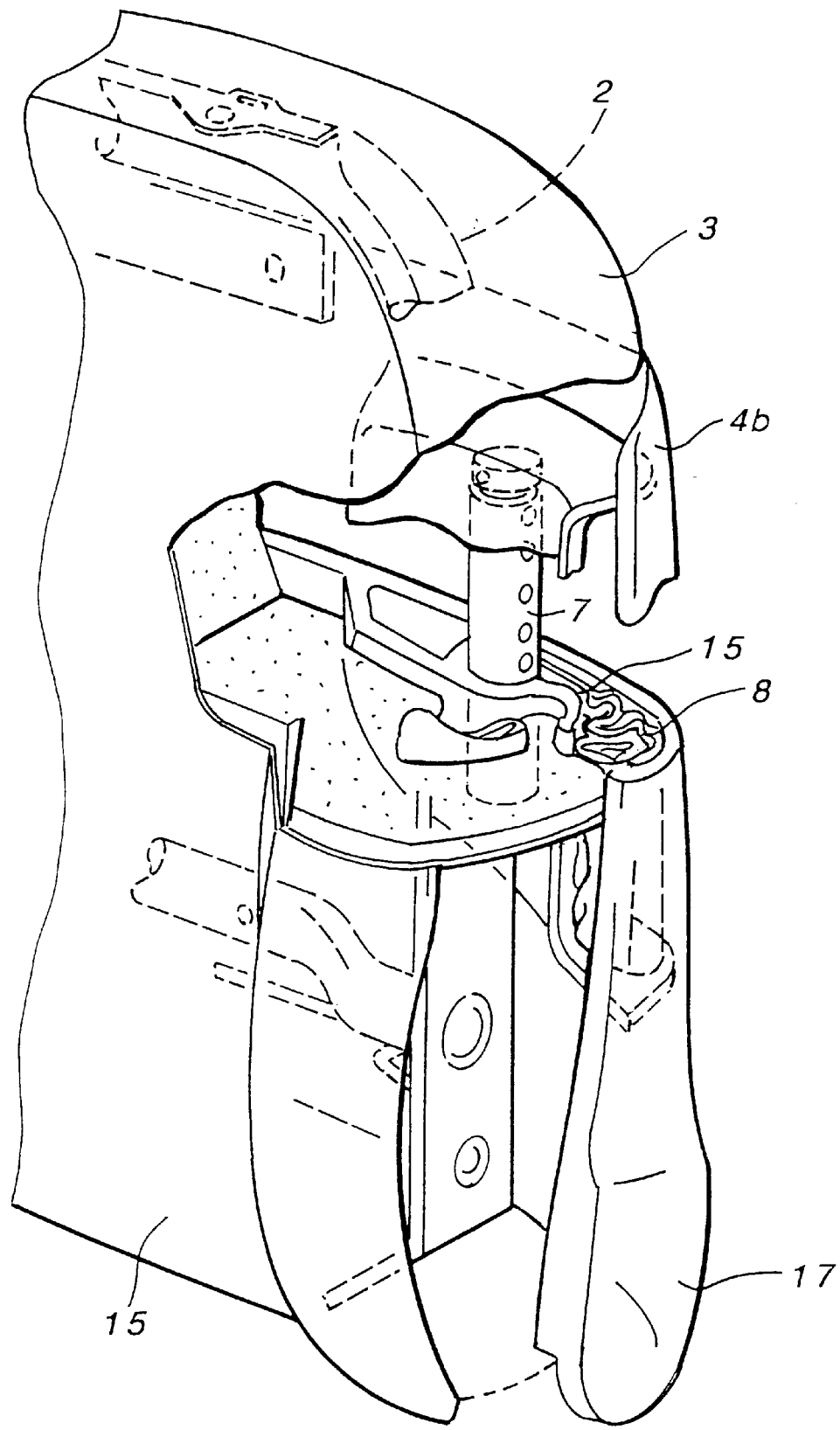

FIG. 4 flushes a partial sectional cut-away view of an automotive seat, showing the location of a plastic seat back support integrated side impact module according to the invention, with a moulded exposed trim panel.

Figure 5:
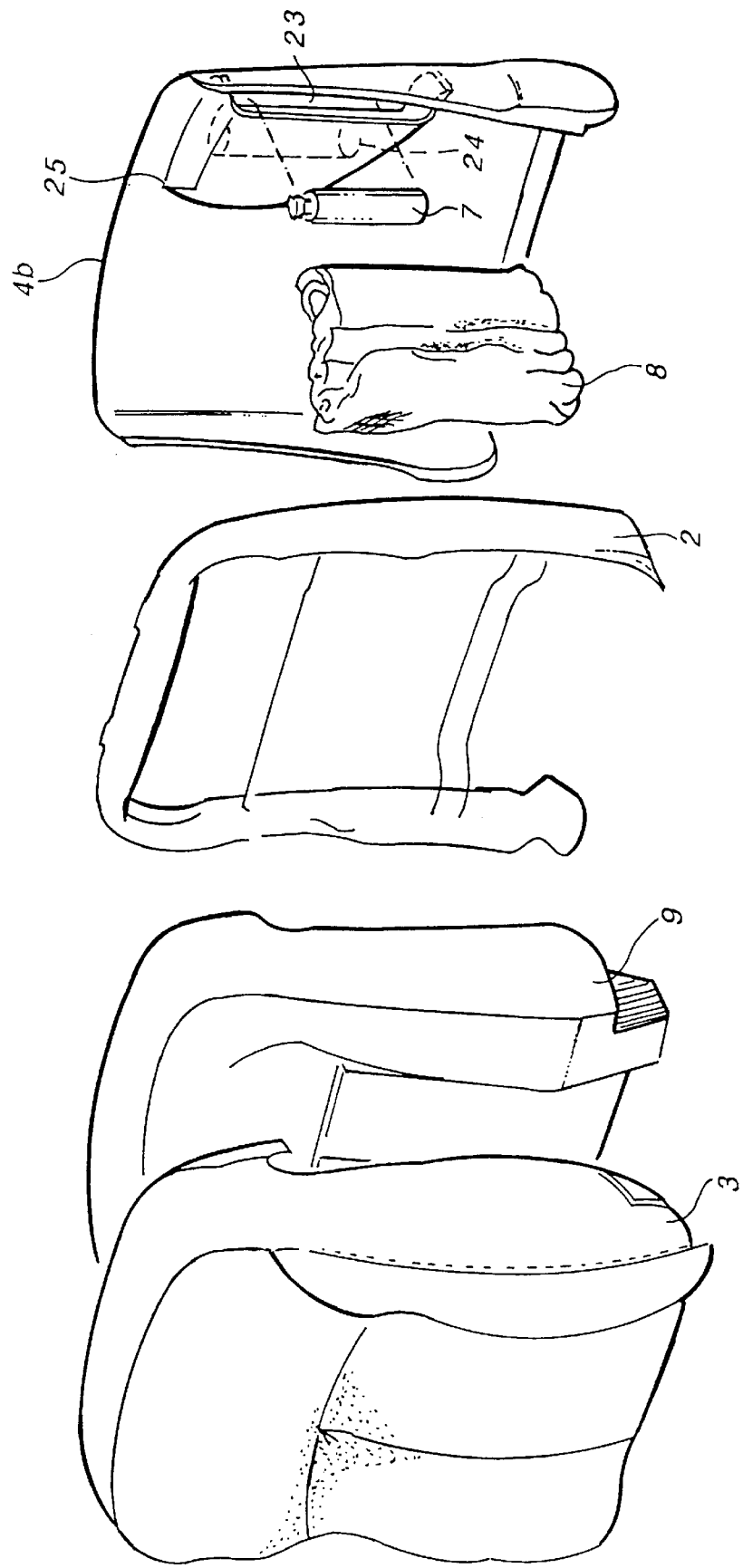

FIG. 5 illustrates an assembly view showing the major components of an embodiment of the invention with a moulded exposed trim panel.

Figure 6:
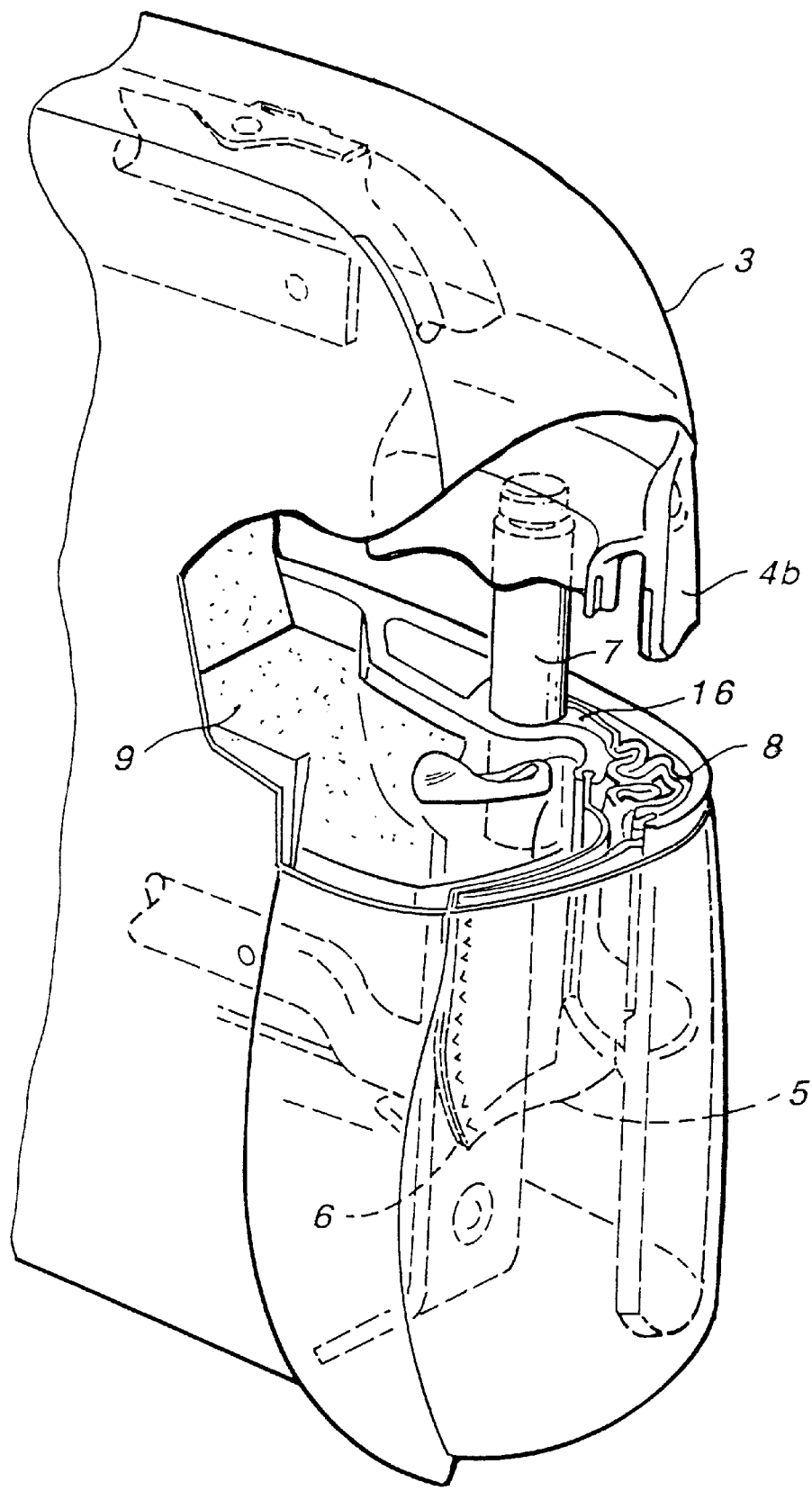

FIG. 6 illustrates a partial sectional cut-away view of an automotive seat, showing the location of a plastic seat back support integrated side impact module according to the invention, with a moulded hidden trim panel.

Figure 7:
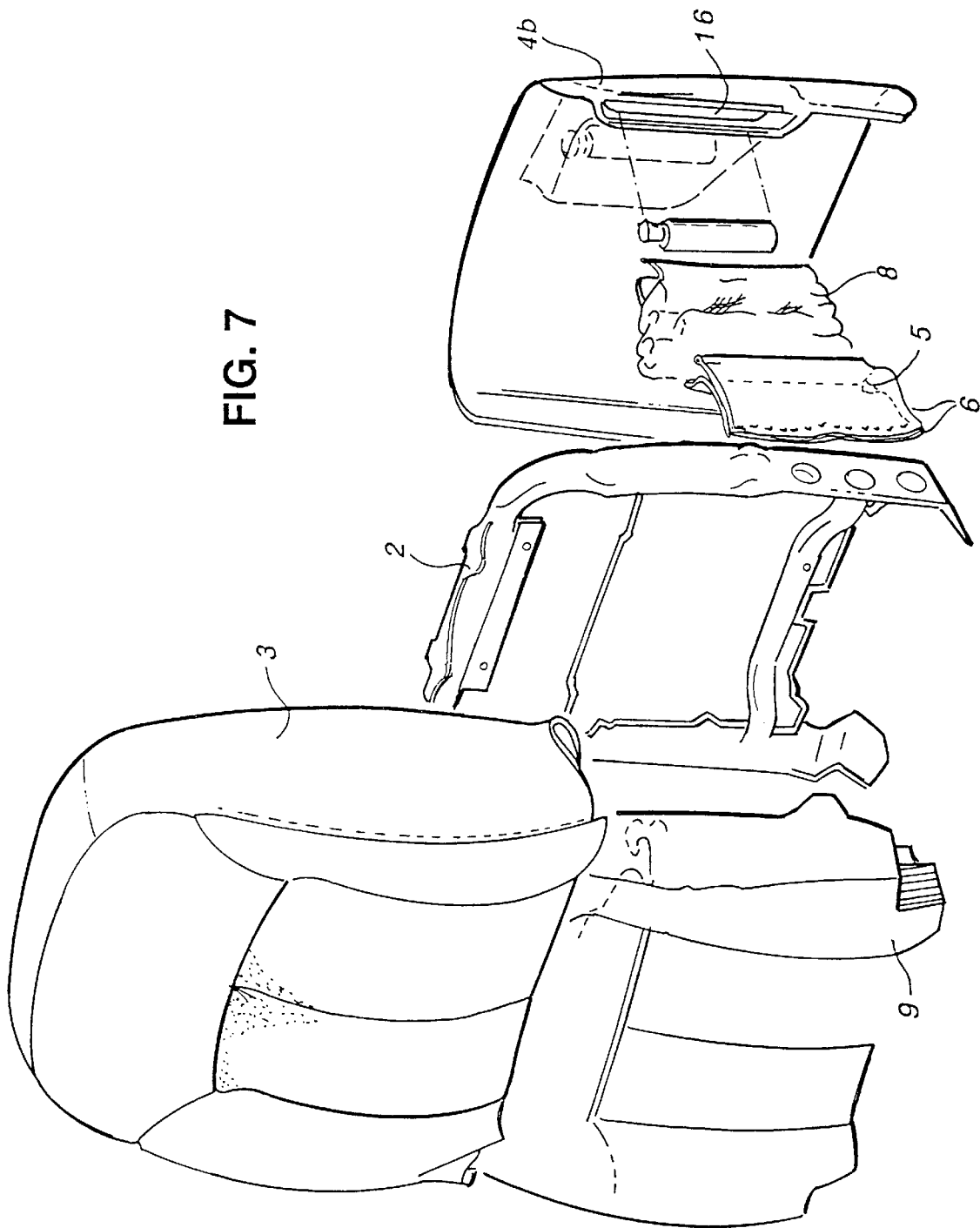

FIG. 7 illustrates an assembly view showing the major components of an embodiment of the invention with a moulded hidden trim panel.

DETAILED DESCRIPTION OF THE DRAWINGS

Figure 1:
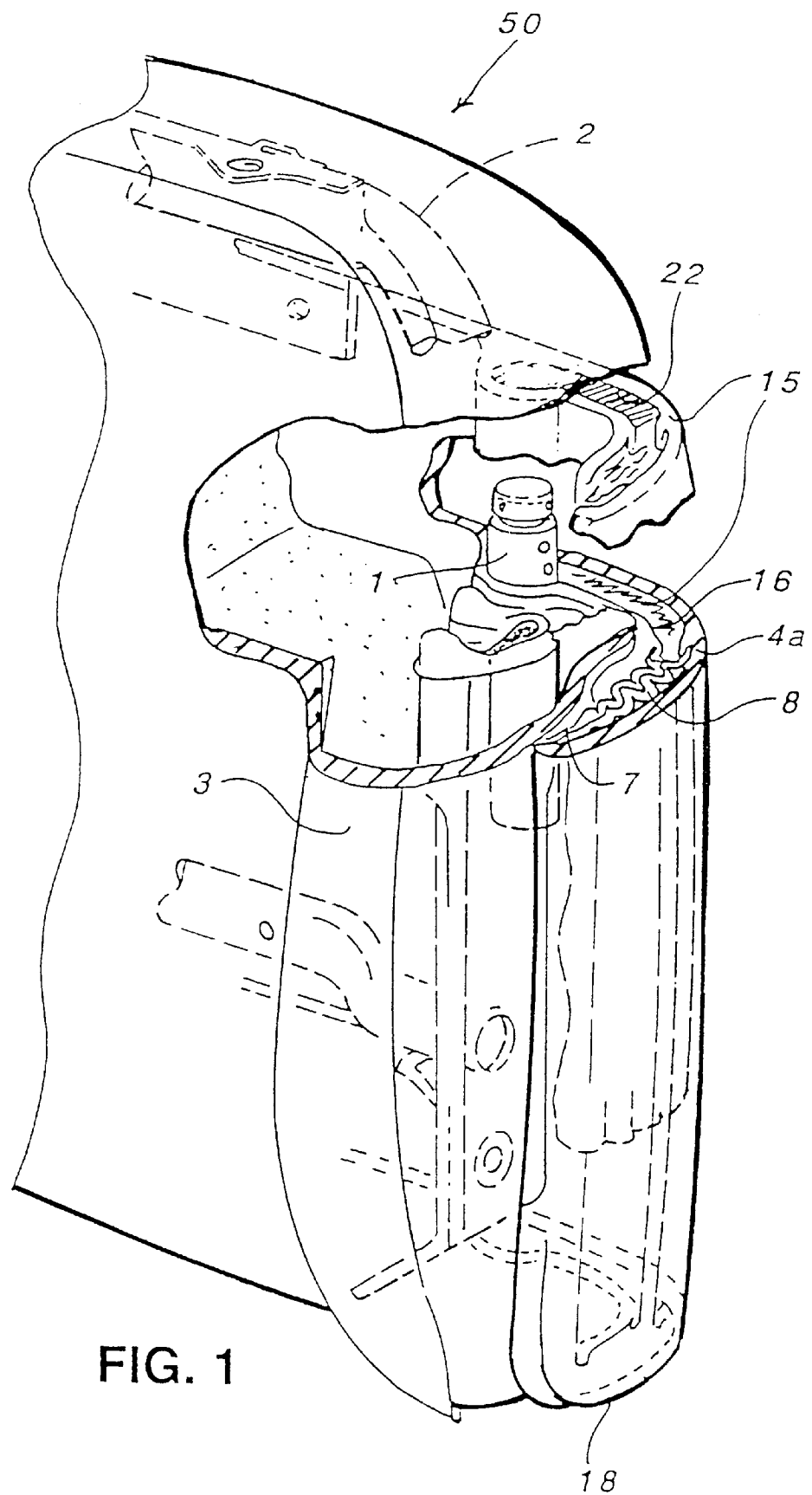
FIG. 1 illustrates a partial sectional view of an automotive seat, showing the location of a plastic seat back support integrated side impact module (extruded; exposed tnm panel).

FIG. 1 shows an extruded, exposed side impact module in a seat back support, shown part cut away.

FIG. 1 illustrates a partial cut away view of an automotive seat 50, showing the location of a seat back support 4a housing an integrated side impact air bag module (extruded version). The seat 50 has a seat cover 3. An air bag cushion 8 is attached with sliding rods or rivets to the seat back support 4a. This new form of seat back support 4a is used as a seat back support in the conventional manner but the shape has been extruded to hold an inflator 1 for the air bag cushion 8 and to create a gas channel 16 from the inflator 1 to the mounting area of the cushion 8.

This side impact module consists essentially of only three major parts: the inflator 1, the seat back support 4a and the air bag cushion 8; all other parts are minor like attachment bolts of the seat back support to the seat and end caps 22 to close the extruded channel 16.

During the deployment of the air bag cushion 8, gas is generated by the inflator 1 and flows through the gas channel 16 into the cushion 8 which in its undeployed condition is positioned adjacent the outer edge of the seat When the gas fills the cushion 8 it will bend the outside part 7 of the seat back support 4a away from the seat 50 towards the vehicle door and allow the cushion to inflate fully and create an air bag cushion between the occupant and the adjacent side of the vehicle during a side impact accident.

Figure 2:
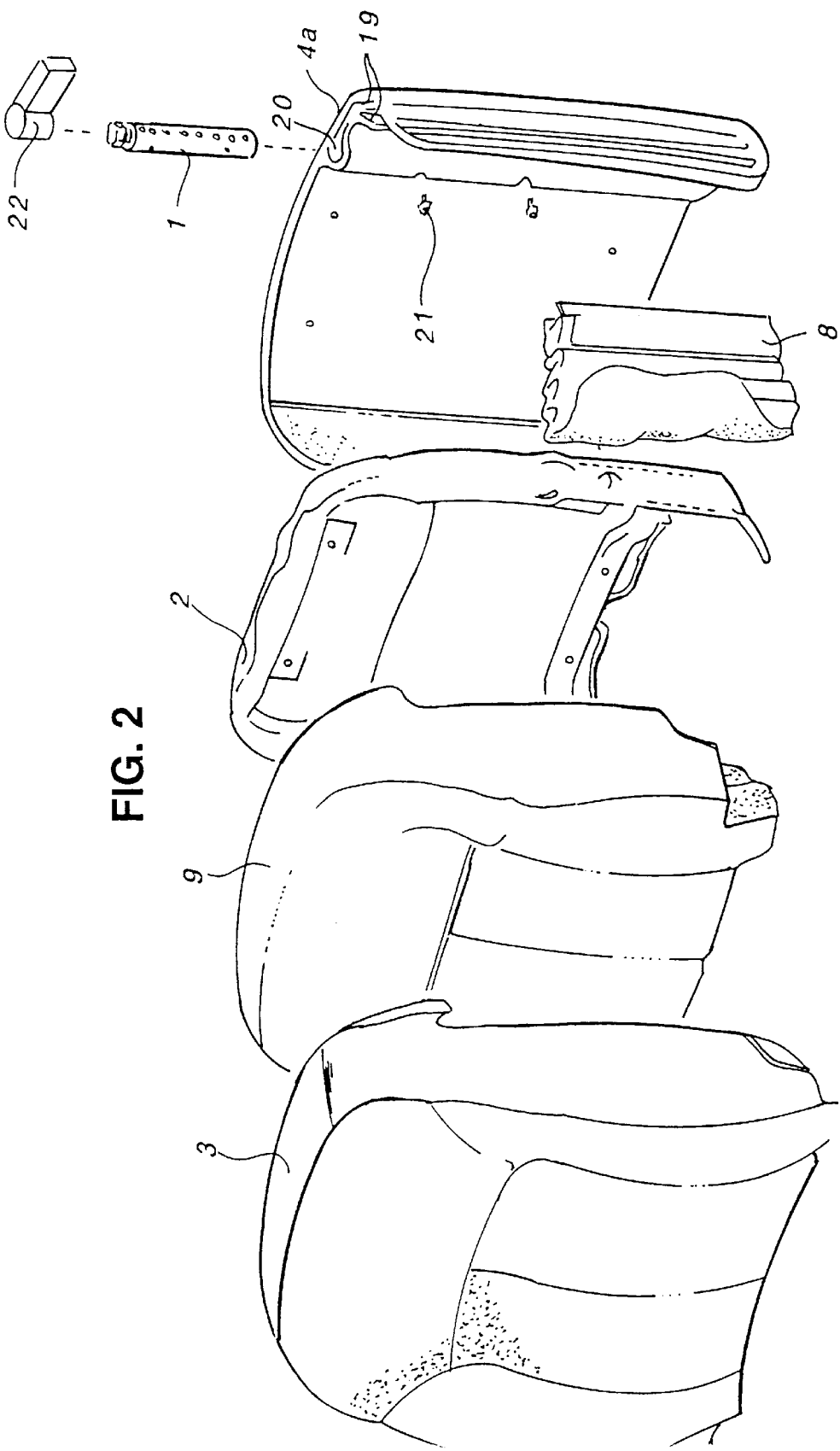
FIG. 2 illustrates an assembly view showing the major components of an embodiment of the invention with an extruded exposed trim panel.

FIG. 2 shows an extruded, exposed side impact module in a seat back support, in exploded view.

FIG. 2 illustrates assembly of the module shown in FIG. 1. As illustrated there are three major parts, but only two new parts will be introduced to the vehicle seat system since for many vehicles there are already existing seat back supports. The cushion 8 will slide into the cushion slide retention channel 19 during the seat back support assembly. The inflator 1 will be pressed into the inflator channel 20 and is fixed with orientation bolts 21 or clamped with a snap-on ring. Subsequently the channels 19 and 20 are closed with end caps 22 at the top and bottom of the extruded shape. The seat back support 17 can be installed at any time of the seat assembly process, since it is independent of the seat 15. It is advantageous if a three-quarter length of the seat back is supported by a seat back support. As illustrated the seat cover 3 and foam 9 cover the other one-quarter of the visible back side of the seat 15, so the seat back support can be attached easily at the end of the seat assembly process.

Figure 3:
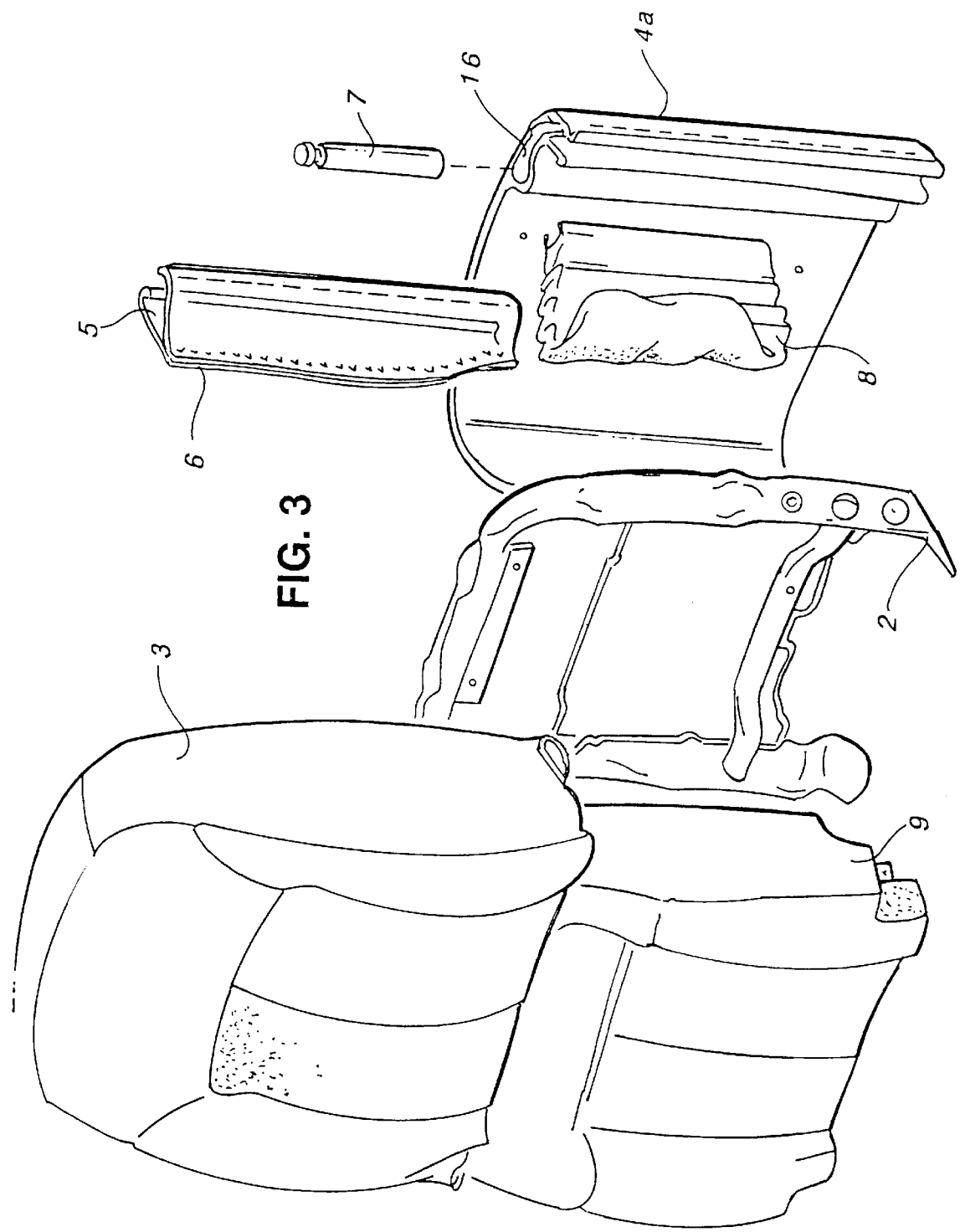
FIG. 3 illustrates an assembly view showing the major components of an embodiment of the invention with an exuded hidden trim panel.

FIG. 3 shows an extruded seat back support assembly with hidden side impact module.

FIG. 3 illustrates an embodiment of the assembly or the described invention in the extruded version of the seat back support 4a but the seat back support is hidden by the seat cover 3 and therefore invisible to the occupant. The air bag will be deployed as described above in relation to FIG. 2 but has an additional feature of a seat cover integrated tear pocket 5 which includes a visible tear seam 6 and is attached to the extruded seat back support 4a. This tear pocket 5 will improve tire controlled opening of the seat cover 3 since it is sewn to the seat cover 3 with the tear seam 6 and connected to the seat back support. When the bag 8 is filled with gas the forces are directed to the tear seam 6 and open the seat cover 3 at the tear seam 6. As mentioned this is an additional feature and might not be necessary based on the structure of the seam of the seat cover 3 at the desired location of the tear seam. For example the opening of the seat cover can be achieved also by deploying the cushion 8 directly against the inside of the seat cover 3 and limiting the strength of the seat cover seam.

FIG. 4 shows a moulded seat back support with an exposed side impact module in part cut away view.

FIG. 4 illustrates a partial sectional view of an automotive seat, showing the location of a moulded version of a seat back support integrated side impact air baa module. Shown is a seat 50 with a seat cover 3 having an air bag cushion 8 attached with sliding rods or rivets to a seat back support. This new seat back support has a moulded shape added to hold the inflator 1 and to create a gas channel 14 to the mounting area of the side impact cushion 8. Therefore the side impact module essentially consists of only three major parts: the inflator 1, the seat back support and the air bag cushion 8, all other parts being minor, for example attachment bolts of the seat back support.

During deployment of the air bag, gas is generated by the inflator 1 and flows through the gas channel 16 into the cushion 8 which in its undeployed condition is situated next to the outward facing side of the seat 50. When the gas fills the cushion it bends the outward side 18 of the seat back support towards the vehicle door and allow the cushion to inflate fully and create an air bag cushion between the occupant and the adjacent side of the vehicle during a side impact accident.

FIG. 5 shows a moulded seat back support with an exposed side impact module in exploded view.

FIG. 5 illustrates assembly of a moulded version of a seat back support incorporating the invention. As illustrated there are three major parts, but only two new parts need to be introduced into the vehicle seat system since for many vehicles there are already existing seat back supports. A cushion 8 slides into a cushion mounting area 23. It is orientated inside a moulded side impact housing 25 in such a way that when an inflator 1 is pressed into an inflator mounting hole 24, the cushion 8 is wrapped around the inflator 1. In the alternative the cushion 8 can be wrapped around the inflator 1 before both parts are pressed together into the cushion mounting channel 23 as one operation. In this case the inflator opening 24 is not necessary any more at the one side of the moulded housing 25.

In this version of the invention the seat back support 17 can be installed at any time of the set assembly process, since it is independent of the seat 15. It is preferred to install a three-quarter length of the seat back as a seat back support. As illustrated the seat cover 3 and foam cover the other one-quarter of the visible back side of the seat 50. Hence the seat back support can be attached easily at the end of the seat assembly process.

FIG. 6 shows a moulded seat back support WITH A hidden side impact module in part cut away section.

FIG. 6 illustrates an automotive seat in part cut away sectional view. It shows the location of a moulded version of a seat back support integrated side impact air bag module. The seat with seat cover 3 has an air bag cushion 8 attached as described above in reference to FIG. 5. This seat back support performs the function of a seat conventional back support but the invention provides for a moulded shape to be added to hold the inflator 1 and create a gas channel 16 to the mounting area of the side impact cushion 8.

Again it will be seen that the side impact module consists of only three major parts: the inflator, the seat back support and the air bag cushion, all other parts being minor, like attachment bolts of the seat back support.

During deployment of the air bag, gas is generated by the inflator 1, and it flows through the gas channel 16 into the cushion 8 which, in its undeployed condition, is situated adjacent the outward facing side 18 of the seat 15. When the gas fills the cushion 8 the outward side of the seat back support is bent towards the door allowing the cushion to inflate fully and create an air bag cushion between the occupant and the intruding side of the vehicle during a side impact accident.

In this moulded version of the seat back support 4b, the seat back support is hidden by the seat cover 3 and therefore invisible to the occupant. The air bag is deployed as described above in relation to FIG. 2 but there is an additional in the form of a tear packet 5 integrated into the seat cover. This includes a visible tear seam and is attached to the extruded seat back support 4a. This tear pocket 5 improves the controlled opening of the seat cover 3 by the inflating air bag cushion since it 15 is sewn into the seat cover 3 with the tear seam 6 and is connected to the seat back support. When the bag 8 is filled with gas the inflation forces are directed to the tear seam 6 and open the seat cover 3 at the tear seam 6. As mentioned this is an additional feature and is not necessarily required depending upon the structure of the seat cover 3 seam at the desired location tear seam. The opening of the seat cover can be accomplished alternatively by deploying the cushion 8 directly against the inside of the seat cover 3.

FIG. 7 shows a moulded seat back support with a hidden side impact module in exploded view.

FIG. 7 shows the function of the tear seam concept detail. As can be seen, the air bag cushion 8 is folded inside the seat cover 3 integrated Docket 5 next to the foam 9 of the seat. The tear seam 6 is so constructed that all other sides of the pocket 5 are stronger (as regards tear strength) than the tear seam 6 for example by using thread of different strengths. As the bag inflates the cushion C is filled inside the pocket first. The outside walls of the pocket (made out of strong fabric material) will direct the inflation forces directly to the tear seam (which is the weakest point in this closed system) and will tear the tear seam threads. Subsequently filling air gas inflate the cushion further and open the complete seat cover like a zip. Once the pocket is opened the bag will be positioned between the occupant and the vehicle door.

What is claimed is:

1. A vehicle safety arrangement comprising a sat back support (4*a*, 17) adapted to be attached to the back of a vehicle seat (50) and a side impact protective airbag module comprising an inflator (1) and a folded inflatable airbag (8) characterised in that the seat back support (4*a*, 17) is formed with integral flanges (7, 18, 19) providing a housing for the inflator, and providing a gas channel (16) linking the inflator with air bag.

2. A vehicle safety arrangement according to claim 1, characterised in that the integral flanges (7, 18, 19) are formed by moulding the seat back support (4*a*, 17).

3. A vehicle safety arrangement according to claim 1, characterised in that the integral flanges (7, 18, 19) are formed by extrusion of the seat back support (4*a*, 17).

4. A vehicle safety arrangement according to claim 1, characterised in that the flanges (7, 18, 19) further provide a housing for the folded airbag (8), and define a fixed direction of inflation opening for the inflating airbag (8), generally in a direction toward the front of the seat (50).

5. A vehicle safety arrangement according to claim 4, characterised in that integral flanges (7, 18, 19) comprise two side walls, relatively closely spaced and generally parallel to each other and to the side of the seat (50) and extending at least partially at the side of the vehicle seat (50) and wherein at least the outwardly positioned side wall (7) is resilient so as to flex outwardly under pressure exerted by an inflating air bag (8).

6. A vehicle safety arrangement according to claim 1, characterised in that the flanges (7, 18, 19) form a generally cylindrical, vertically extending chamber in the region of their connection to the seat back support.

7. A vehicle safety arrangement according to claim 1, characterised in that the seat back support (4*a*, 17) has snap-fit or bolting means for connection to a vehicle seat in a position on the seat (50) which provides stiffness to the back of the seat to resist a rear occupant sliding under the seat (50).

8. A vehicle safety arrangement according to claim 1, characterised in that the air bag module has a length shorter than the height of the back of the seat (50).

9. A vehicle safety arrangement according to claim 1, characterised by an air bag (8) of an elongate arcuate shape.

10. A vehicle safety arrangement according to claim 1, characterised by an air bag (8) of a sausage shape.

11. A vehicle safety arrangement according to claim 1, characterised by an air bag (8) of a shape which protects both head and torso of a vehicle occupant in response to a crash situation.

12. A vehicle safety arrangement according to claim 1, characterised in that the air bag (8) comprises a plurality of mechanical attachment means spaced along its inflation opening and the peripheral edges of the flanges (7, 18, 19) comprise cooperative mechanical attachment means.

13. A vehicle safety arrangement according to claim 1, characterised in that the air bag module is covered by a vehicle seat cover (3).

14. A vehicle safety arrangement according to claim 13, characterised in that the folded air bag (8) is contained within a flexible fabric pocket (5) within the housing (25).

15. A vehicle safety arrangement according to claim 14, characterised in that fabric pocket (5) is attached to a seam of the seat cover (3).

16. A vehicle safety arrangement according to claim 15, characterised in that the pocket (5) has a seam (6) which is coextensive with a portion of the seam of the seat cover (3).

17. A vehicle safety arrangement according to claim 15, characterised in that the seam (6) is stitched with a thread having a tear strength of between 100 and 500 Newtons.

18. A vehicle safety arrangement according to claim 1, characterised in that the air bag module is covered with a dust protector sealing the open edges of the seat back support flanges (7, 18, 19).

19. A vehicle safety arrangement according to claim 18, characterised in that the dust protector is a tape.

20. A vehicle safety arrangement according to claim 16, characterised in that each seam (6) is stitched with a thread having a tear strength of between 100 and 500 Newtons.

* * * * *